US011537606B2

(12) United States Patent
Wang et al.

(10) Patent No.: US 11,537,606 B2
(45) Date of Patent: Dec. 27, 2022

(54) SOLUTION FOR IMPLEMENTING COMPUTING SERVICE BASED ON STRUCTURED QUERY LANGUAGE STATEMENT

(71) Applicant: Advanced New Technologies Co., Ltd., George Town (KY)

(72) Inventors: Yi Wang, Hangzhou (CN); Yang Yang, Hangzhou (CN); Weiguo Zhu, Hangzhou (CN); Yongfeng Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/796,088

(22) Filed: Feb. 20, 2020

(65) Prior Publication Data

US 2020/0293519 A1 Sep. 17, 2020

(30) Foreign Application Priority Data

Mar. 12, 2019 (CN) .......................... 201910183056.8

(51) Int. Cl.
*G06F 16/242* (2019.01)
*G06F 16/2458* (2019.01)
(Continued)

(52) U.S. Cl.
CPC ...... *G06F 16/2445* (2019.01); *G06F 16/2458* (2019.01); *G06F 16/24575* (2019.01); *G06K 9/6218* (2013.01); *G06N 3/08* (2013.01)

(58) Field of Classification Search
CPC ............ G06F 16/2445; G06F 16/2458; G06F 16/24575; G06K 9/6218; G06N 3/08
See application file for complete search history.

(56) References Cited

U.S. PATENT DOCUMENTS 10,176,435 B1 * 1/2019 Sarkar ................... G06N 20/00
10,990,850 B1 * 4/2021 Chen ..................... G06N 20/00
(Continued)

FOREIGN PATENT DOCUMENTS

| CN | 101901222 | 12/2010 |
|---|---|---|
| CN | 108345603 | 7/2018 |
| TW | 445421 | 7/2001 |

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ashish Thomas
*Assistant Examiner* — Dustin D Eyers
(74) *Attorney, Agent, or Firm* — Fish & Richardson P.C.

(57) ABSTRACT

Syntax parsing on a SQL statement is performed to determine whether an extended syntax identifier exists in the SQL statement, where the extended syntax identifier indicates a target computing service for the SQL statement. It is determined that the extended syntax identifier exists in the SQL statement. A computing service description statement in a first statement format is generated based on the SQL statement, where the first statement format is a statement format that can be recognized by a target computing framework. The computing service description statement is submitted to the target computing framework. Data queried by the SQL statement is invoked, in the target computing framework based on the computing service description statement, to perform target computation, where the SQL statement includes a computing element needed by the target computing service.

17 Claims, 9 Drawing Sheets

(51) Int. Cl.
*G06F 16/2457* (2019.01)
*G06K 9/62* (2022.01)
*G06N 3/08* (2006.01)

(56) References Cited

U.S. PATENT DOCUMENTS

| | | |
|---|---|---|
| 2006/0074862 A1 | 4/2006 | Redburn |
| 2007/0038985 A1* | 2/2007 | Meijer .................. G06F 8/51 |
| | | 717/137 |
| 2009/0119641 A1 | 5/2009 | Ramsey et al. |
| 2012/0239612 A1* | 9/2012 | George ............... G06F 16/254 |
| | | 707/602 |
| 2012/0290608 A1* | 11/2012 | Dantressangle .. G06F 16/24561 |
| | | 707/769 |
| 2016/0063063 A1 | 3/2016 | Tsai |
| 2017/0103106 A1 | 4/2017 | Kass |
| 2017/0124487 A1* | 5/2017 | Szeto ................ G06F 11/1448 |
| 2017/0262501 A1 | 9/2017 | Namboodiri et al. |
| 2018/0084007 A1* | 3/2018 | Dinerstein ............ G06F 21/554 |
| 2018/0157978 A1* | 6/2018 | Buda ..................... G06N 20/00 |
| 2019/0042288 A1 | 2/2019 | Hanumantharau et al. |
| 2019/0147128 A1* | 5/2019 | O'Connor ............. G16H 30/20 |
| | | 703/11 |
| 2019/0156247 A1* | 5/2019 | Faulhaber, Jr. ...... G06N 3/0454 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln. No. PCT/US2020/016719, dated Jun. 16, 2020, 12 pages.

Zhou et al., "Detection of SQL injection behaviors for PHP applications," Journal of Computer Applications, Jan. 2018, 38(1):201-206, 211 (with English abstract).

* cited by examiner

| SELECT * | Standard SQL |
| --- | --- |
| FROM iris.iris | Standard SQL |

FIG. 3A

| | |
|---|---|
| SELECT * | Standard SQL |
| FROM iris.iris | Standard SQL |
| TRAIN DNNClassifier | Extended syntax identifier and machine learning model |
| WITH n_classes = 3, hidden_units = [10, 20] | Model parameter |
| COLUMN sepal_length, sepal_width, petal_length, petal_width | Model feature |
| LABEL class | Model label |
| INTO my_dnn_model | Training result storage |

FIG. 3B

| SELECT * | Standard SQL |
| --- | --- |
| FROM iris.iris | Standard SQL |
| PREDICT iris.predict.class | Extended syntax identifier and prediction target |
| USING my_dnn_model | Used model address |

FIG. 3C

SOLUTION FOR IMPLEMENTING COMPUTING SERVICE BASED ON STRUCTURED QUERY LANGUAGE STATEMENT

CROSS-REFERENCE TO RELATED APPLICATIONS

This application claims priority to Chinese Patent Application No. 201910183056.8, filed on Mar. 12, 2019, which is hereby incorporated by reference in its entirety.

TECHNICAL FIELD

The present disclosure generally relates to the field of computer technologies, and more specifically, to a method and apparatus for implementing a computing service based on a structured query language statement.

BACKGROUND

When computation is performed by using structured query language (SQL) statement data, for example, when machine learning model training is performed by using SQL data, a user usually needs to write a machine learning script by using the R or Python programming language, and embeds the written machine learning script in a SQL program statement for execution, so as to implement the machine learning model training. In this case, the user needs to be familiar with the SQL language and other non-SQL languages such as the Python language, and able to perform program writing by using the SQL language and the other non-SQL languages such as the Python language. Consequently, higher demands are imposed on the user.

SUMMARY

In view of the previous description, the present disclosure provides a method and apparatus for implementing a computing service based on an SQL statement. By using the method and the apparatus, an existing SQL syntax is extended, so that an extended SQL statement includes information about a computing element needed by a computing service, and after an extended SQL statement is received, the extended SQL statement is parsed and a computing service description statement that can be recognized by a target computing framework is generated based on computing element information. As such, a computing service is performed in the target computing framework based on the generated computing service description statement, so that a user's ability to write programs needed for target computing framework is not required.

According to an aspect of the present disclosure, a method for implementing a computing service based on a structured query language statement is provided, including: performing syntax parsing on a structured query language statement to determine whether an extended syntax identifier exists in the structured query language statement, where the extended syntax identifier indicates a target computing service for the structured query language statement; generating a computing service description statement in a first statement format based on the structured query language statement when the extended syntax identifier exists in the structured query language statement, where the first statement format is a statement format that can be recognized by a target computing framework; and submitting the generated computing service description statement to the target computing framework, to invoke, in the target computing framework based on the computing service description statement, data queried by the structured query language statement to perform target computation, where the structured query language statement includes a computing element needed by the target computing service, when the extended syntax identifier exists in the structured query language statement.

Optionally, in an example of the previous aspect, the target computing service includes a machine learning computing service or a cluster computing service.

Optionally, in an example of the previous aspect, the machine learning computing service includes machine learning model training or machine learning model prediction.

Optionally, in an example of the previous aspect, the generating a computing service description statement in a first statement format based on the structured query language statement includes: generating data query program code in the first statement format based on a data query element in the structured query language statement; and generating machine learning program code in the first statement format based on a computing service element in the structured query language statement.

Optionally, in an example of the previous aspect, the computing element includes a machine learning model name, a machine learning model parameter, a machine learning model feature, a machine learning model label, and a machine learning computation result storage address; and the generating machine learning program code in the first statement format based on a computing service element in the structured query language statement includes: invoking a machine learning program code template corresponding to the machine learning model name; and providing the machine learning model parameter, the machine learning model feature, and the machine learning model label to the machine learning program code template, to generate the machine learning program code in the first statement format.

Optionally, in an example of the previous aspect, after the target computing framework invokes the data queried by the structured query language statement to perform the target computation based on the machine learning program code, the target computing framework stores a target computation result in the machine learning computation result storage address in a structured query language database.

Optionally, in an example of the previous aspect, before the generating a computing service description statement in a first statement format based on the structured query language statement, the method further includes: performing semantic verification on the structured query language statement.

Optionally, in an example of the previous aspect, the method can further include: obtaining the structured query language statement input from a client input.

According to another aspect of the present disclosure, an apparatus for implementing a computing service based on a structured query language statement is provided, including: a syntax parsing unit, configured to perform syntax parsing on a structured query language statement to determine whether an extended syntax identifier exists in the structured query language statement, where the extended syntax identifier indicates a target computing service for the structured query language statement; a computing service description statement generation unit, configured to generate a computing service description statement in a first statement format based on the structured query language statement when the extended syntax identifier exists in the structured query language statement, where the first statement format is a statement format that can be recognized by a target computing framework; and a description statement submission unit, configured to submit the generated computing service description statement to the target computing framework, to invoke, in the target computing framework based on the computing service description statement, data queried by the structured query language statement to perform target computation, where the structured query language statement includes a computing element needed by the target computing service, when the extended syntax identifier exists in the structured query language statement.

Optionally, in an example of the previous aspect, the target computing service includes a machine learning computing service or a cluster computing service.

Optionally, in an example of the previous aspect, the machine learning computing service includes machine learning model training or machine learning model prediction; and the computing service description statement generation unit includes: a data query code generation module, configured to generate data query program code in the first statement format based on a data query element in the structured query language statement; and a machine learning code generation module, configured to generate machine learning program code in the first statement format based on a computing service element in the structured query language statement.

Optionally, in an example of the previous aspect, the computing element includes a machine learning model name, a machine learning model parameter, a machine learning model feature, a machine learning model label, and a machine learning computation result storage address; and the machine learning code generation module is configured to invoke a machine learning program code template corresponding to the machine learning model name, and provide the machine learning model parameter, the machine learning model feature, and the machine learning model label to the machine learning program code template, to generate the machine learning program code in the first statement format.

Optionally, in an example of the previous aspect, the apparatus can further include: a semantic verification unit, configured to perform semantic verification on the structured query language statement before the computing service description statement in the first statement format is generated based on the structured query language statement.

Optionally, in an example of the previous aspect, the apparatus can further include: a statement acquisition unit, configured to obtain the structured query language statement from a client input.

According to another aspect of the present disclosure, a system for implementing a computing service based on a structured query language statement includes: a client device, configured to input a structured query language statement; the previously described apparatus for implementing a computing service based on a structured query language statement; a target computing framework; and a structured query language database.

According to another aspect of the present disclosure, a computing device is provided, including: at least one processor, and a storage device coupled to the at least one processor, where the storage device stores an instruction, and when the instruction is executed by the at least one processor, the at least one processor is enabled to perform the previously described method for implementing a computing service based on a structured query language statement.

According to another aspect of the present disclosure, a non-transitory machine-readable storage medium is provided, where the non-transitory machine-readable storage medium stores an executable instruction, and when the instruction is executed, the machine is enabled to perform the previously described method for implementing a computing service based on a structured query language statement.

BRIEF DESCRIPTION OF DRAWINGS

Further understanding of the essence and advantages of the content of the present disclosure can be implemented with reference to the following accompanying drawings. In the accompanying drawings, similar components or features can have the same reference numerals.

FIG. 3A is a schematic diagram illustrating an example of a conventional SQL statement, according to an implementation of the present disclosure;

FIG. 3B is a schematic diagram illustrating an example of an SQL statement with an extended syntax identifier, according to an implementation of the present disclosure;

FIG. 3C is a schematic diagram illustrating another example of an SQL statement with an extended syntax identifier, according to an implementation of the present disclosure;

DESCRIPTION OF IMPLEMENTATIONS

The subject matter described in the present specification will now be discussed with reference to example implementations. It should be understood that these implementations are merely discussed to enable a person skilled in the art to better understand and implement the subject matter described in the present specification, and are not intended to limit the protection scope, applicability, or examples described in the claims. The functions and arrangements of the discussed elements can be changed without departing from the protection scope of the content of the present disclosure. Various processes or components can be omitted, replaced, or added in examples based on demands. For example, the described method can be performed in an order different from that described here, and steps can be added, omitted, or combined. In addition, features described related to some examples can also be combined in other examples.

As used in the present specification, the term "include" and its variant represent open terms, meaning "including but not limited to". The term "based" means "at least partially based on". The terms "one implementation" and "an implementation" represent "at least one implementation". The term "another implementation" represents "at least one another implementation". The terms "first", "second", etc. can refer to different objects or the same object. The following can include other definitions, whether explicit or implicit. The definition of a term is consistent throughout the specification, unless otherwise explicitly specified in the context.

In an implementation of the present disclosure, an existing SQL syntax is extended, so that an extended SQL statement includes information about a computing element needed by a computing service, and an SQL statement processing apparatus is created between an SQL engine (i.e., an SQL client) and a target computing framework. The SQL statement processing apparatus receives an SQL statement submitted by the SQL engine, and performs syntax parsing on the SQL statement submitted by the SQL engine. After it is obtained through parsing that the received SQL statement is an extended SQL statement, a computing service description statement that can be recognized by the target computing framework is generated based on computing element information included in the SQL statement, and then the generated computing service description statement is submitted to the target computing framework. As such, a computing service is performed in the target computing framework based on the generated computing service description statement, so that a user's ability to write programs needed for target computing framework is not required.

The following describes in detail, with reference to the accompanying drawings, a system and method for implementing a computing service based on an SQL statement according to implementations of the present disclosure.

Figure 1:
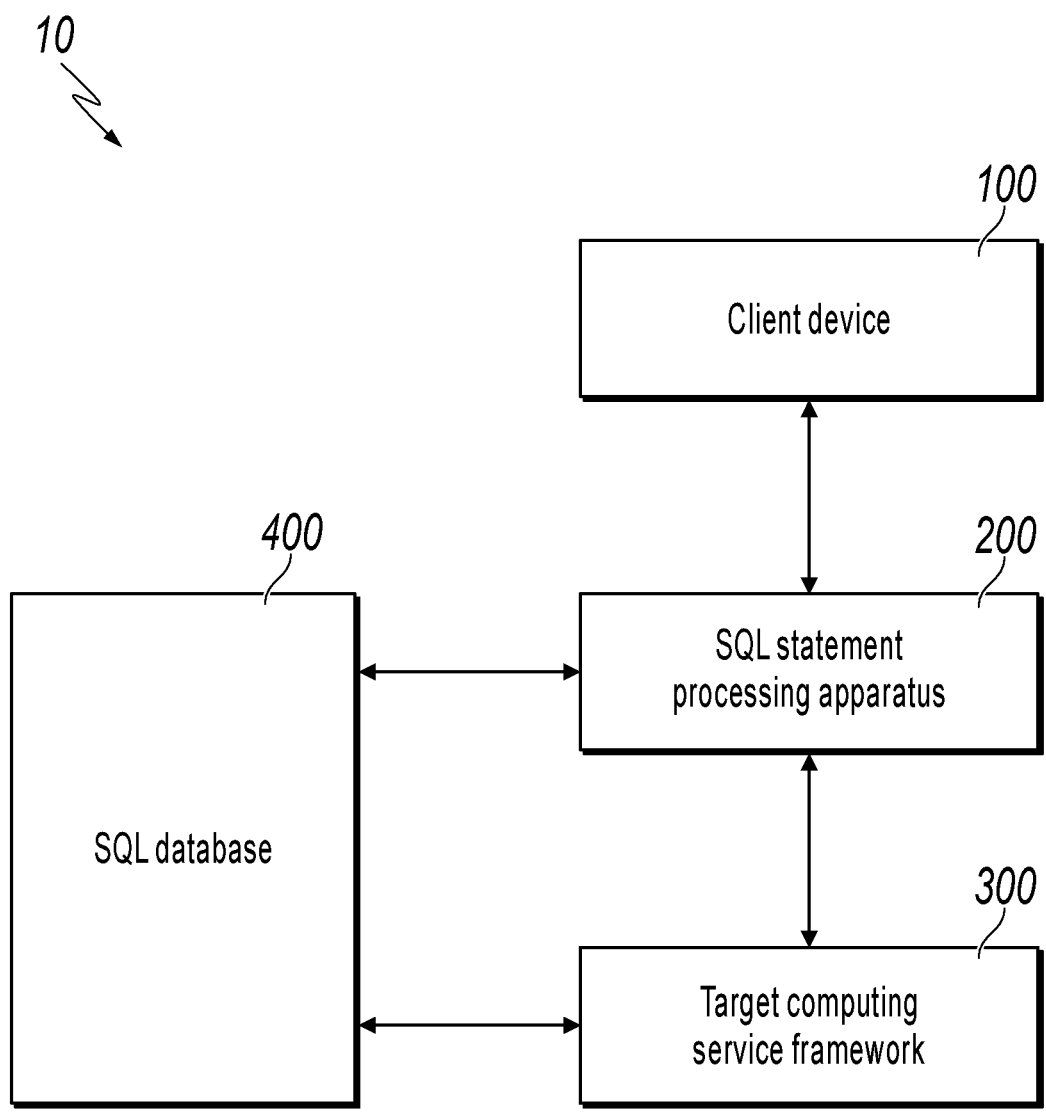
FIG. 1 is a block diagram illustrating a system for implementing a computing service based on a structured query language statement, according to an implementation of the present disclosure.

FIG. 1 is a block diagram illustrating a system 10 for implementing a computing service based on a structured query language statement (referred to as a "computing service implementation system" for short below), according to an implementation of the present disclosure. As shown in FIG. 1, the computing service implementation system 10 includes a client device 100, an SQL statement processing apparatus 200, a target computing framework 300, and an SQL database 400.

The client device 100 is configured to write an SQL statement and submit the written SQL statement to the SQL statement processing apparatus 200. For example, a user can directly write an SQL statement in a browser or in a command line, and then the client device 100 sends the SQL statement to the SQL statement processing apparatus 200 by using a streaming RPC message. In the present disclosure, the SQL statement processing apparatus 200 can support a plurality of clients. For example, a client of the browser can be implemented by adding a Python client to the Jupyter Notebook. The client device 100 has an interactive user interface with good experience. After the SQL statement is entered and submitted through the interactive user interface, status information of the SQL statement process can be displayed on the interactive user interface in real time.

After receiving the SQL statement submitted by the client device 100, the SQL statement processing apparatus 200 performs syntax parsing on the received SQL statement. After a syntax parsing result indicates that the SQL statement is a conventional SQL statement, the SQL statement processing apparatus 200 initiates an SQL query operation to the SQL database 400. After the syntax parsing result indicates that the SQL statement is an extended SQL statement, the SQL statement processing apparatus 200 generates a computing service description statement that can be recognized by the target computing framework 300 based on computing element information included in the SQL statement, and then submits the generated computing service description statement to the target computing framework 300. In the present disclosure, the SQL statement processing apparatus 200 supports an operation performed based on an interactive command line statement, and can return the status information of the SQL statement process to the client device 100 in real time. In the present disclosure, the SQL statement processing apparatus 200 can also be referred to as SQLFLow. Operations and structures of the SQL statement processing apparatus will be described in detail below with reference to the accompanying drawings.

After receiving the computing service description statement, the target computing framework 300 can invoke, based on the computing service description statement, data queried by the structured query language statement to perform target computation. After the target computation is completed, the target computing framework 300 stores a computation result in the SQL database, for example, storing the computation result at an SQL database address specified in the computing service description statement.

The SQL database 400 is configured as a data storage engine for storing to-be-queried data. In the present disclosure, the SQL database can include MySQL, SQLite, Hive, ODPS, SparkSQL, etc.

Figure 2:
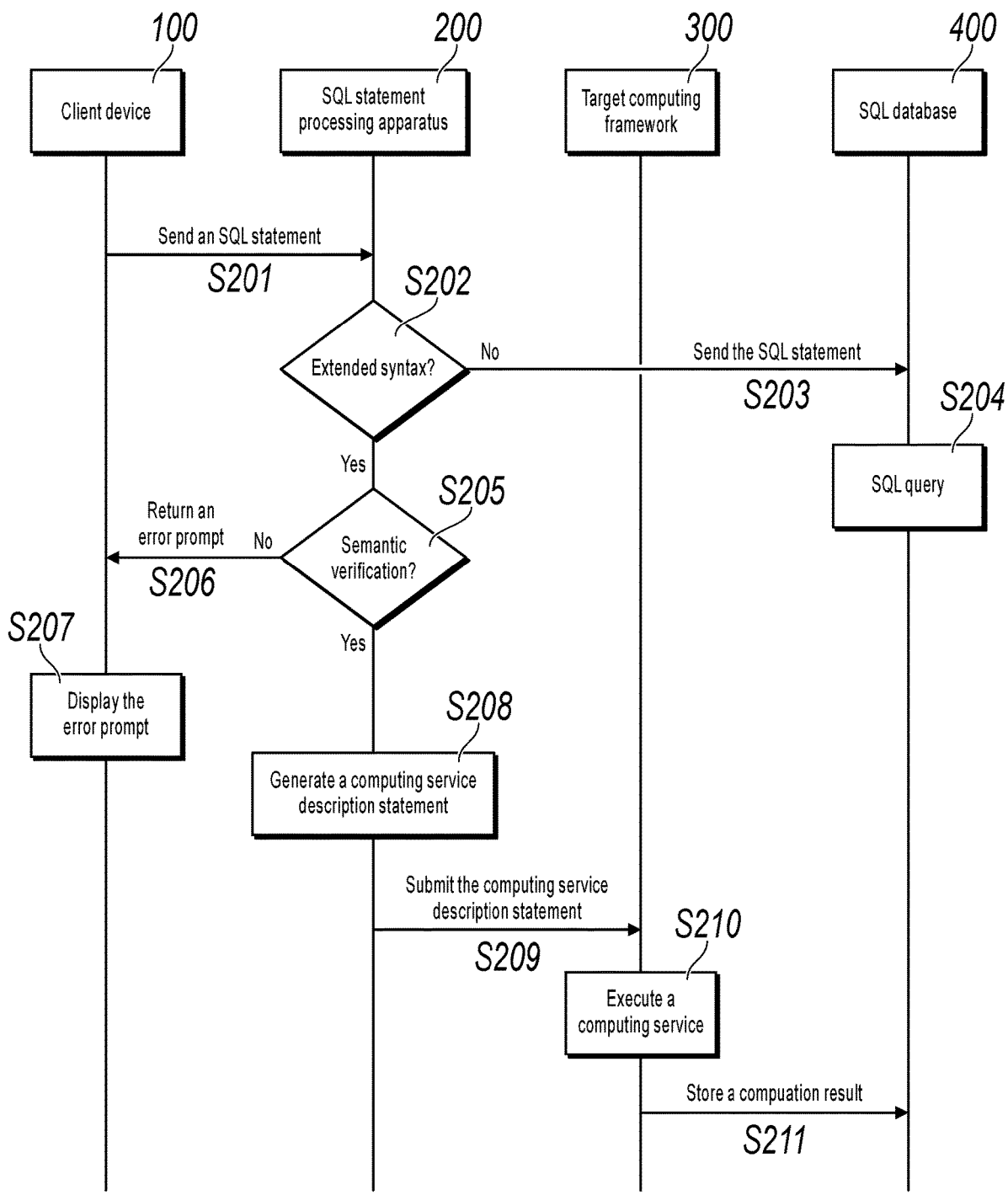
FIG. 2 is a flowchart illustrating a method for implementing a computing service based on a structured query language statement, according to an implementation of the present disclosure.

FIG. 2 is a flowchart illustrating a method for implementing a computing service based on a structured query language statement, according to an implementation of the present disclosure.

As shown in FIG. 2, in block S201, after writing an SQL statement on a client device 100, a user sends the written SQL statement to an SQL statement processing apparatus 200. Message exchange is performed between the client device 100 and the SQL statement processing apparatus 200 by using a streaming RPC message. The sent SQL statement can be a conventional SQL statement, or can be an SQL statement with an extended syntax identifier, that is, an extended SQL statement. An SQL statement syntax extension rule here is specified in advance, and known by both the client device 100 and the SQL statement processing apparatus 200 beforehand.

FIG. 3A is a schematic diagram illustrating an example of a conventional SQL statement, according to an implementation of the present disclosure. The SQL statement shown in FIG. 3A is a conventional SQL statement. The conventional SQL statement indicates "query data with a target attribute from iris.iris", where the target attribute is represented by "*" in the SQL statement.

FIG. 3B is a schematic diagram illustrating an example of an SQL statement with an extended syntax identifier, according to an implementation of the present disclosure. The SQL statement shown in FIG. 3B is an extended SQL statement. The extended SQL statement includes a target computing service used for indicating the structured query language statement. As shown in FIG. 3B, the extended SQL statement includes an extended syntax identifier "TRAIN", and the extended syntax identifier indicates that the target computing service is machine learning model training. In addition, the SQL statement shown in FIG. 3B further includes a computing element needed by the target computing service. When the target computing service is the machine learning model training, the computing element can include a machine learning model name, a machine learning model parameter, a machine learning model feature, a machine learning model label, and a machine learning computation result storage address (i.e., a machine learning computation result storage address).

Specifically, in the SQL statement shown in FIG. 3B, the machine learning model name is "DNNClassfier", that is, a DNN classifier. The machine learning model parameter is "n_classes=3, hidden units=[10, 20]", to be specific, a quantity of classification categories is 3, and a quantity of hidden layer neurons is [10, 20]. The machine learning model feature is "sepal_length, sepal_width, petal_length, petal_width". The machine learning model label is "class". The machine learning computation result storage address is "my_dnn_model", for example, a table in an SQL database. It is worthwhile to note here that the illustration shown in FIG. 3B is merely an example.

FIG. 3C is a schematic diagram illustrating another example of an SQL statement with an extended syntax identifier, according to an implementation of the present disclosure. As shown in FIG. 3C, the extended SQL statement includes an extended syntax identifier "PREDICT", and the extended syntax identifier indicates that a target computing service is machine learning model prediction. The extended SQL statement further includes "iris.predict-.class" and "USING my_dnn_model". Here, "iris.predict-.class" is used to predict a target, to be specific, to predict a category of iris, and "USING my_dnn_model" is used to indicate a used model storage address, to be specific, to use model information stored in my_dnn_model. In addition, the computing element described above with reference to FIG. 3B are recorded in information stored at the used model storage address, to be specific, information stored in "my_dnn_model".

In the present disclosure, in addition to "TRAIN" and "PREDICT", the extended syntax identifier can further include "Cluster". The extended syntax identifier "Cluster" is used to instruct to perform cluster computation, for example, third-party cluster computation. In addition, the extended syntax identifier can further include an extended syntax identifier used to indicate another suitable computing service.

Returning back to FIG. 2, after receiving the SQL statement from the client device 100, the SQL statement processing apparatus 200 performs syntax parsing on the structured query language statement to determine whether an extended syntax identifier exists in the SQL statement in block S202.

When no extended syntax identifier exists in the SQL statement, the SQL statement is sent to an SQL database 400 in block S203, and SQL query is performed in the SQL database 400 in block S204. The SQL database 400 returns data obtained through querying to the client device 100 via the SQL statement processing apparatus 200, to display the data on a display interface of the client device 100.

When the extended syntax identifier exists in the SQL statement, semantic verification is performed on the SQL statement in block S205. Specifically, validity of a data query part in the SQL statement can be verified. For example, the SQL statement processing apparatus 200 can select, based on a data query element in the SQL statement, a small amount of to-be-queried data, to initiate data query to the SQL database 400. If the SQL database 400 can return a query result, it can be considered that the semantic verification succeeds. If the SQL database 400 cannot return a query result, it can be considered that the semantic verification fails. When the semantic verification fails, an error prompt is returned to the client device 100 in block S206, and the error prompt is displayed on the display interface of the client device 100 to notify the user in block S207.

After the semantic verification succeeds, the SQL statement processing apparatus 200 generates a computing service description statement in a first statement format based on the SQL statement in block S208. Here, the first statement format is a statement format that can be recognized by a target computing framework. In the present disclosure, the target computing framework can include TensorFlow, Pytorch, Xgboost, AutoML, etc. The target computing framework can be described, for example, by a computing element in the SQL statement that uniquely identifies the target computing framework. For example, when a target computing service is the machine learning model training shown in FIG. 3B, the target computing framework can be identified by the machine learning model name "DNNClassfier". Here, "DNNClassfier" is, for example, used to indicate that the target computing framework is "TensorFlow". Therefore, the SQL statement processing apparatus 200 generates, based on the SQL statement, a computing service description statement in a statement format that can be recognized by TensorFlow. In addition, a separate identifier can also be set in the computing element to uniquely identify the target computing framework.

In the present disclosure, the target computing service can include a machine learning computing service, a cluster computing service, etc. In addition, the machine learning computing service includes machine learning model training or machine learning model prediction.

When the target computing service is cluster computing, the computing service description statement is a description statement used to execute cluster computation. For example, the description statement can include at least one of the following: a computing task description, training information, loaded data, or model storage information. When the target computing service is the machine learning computing service, the computing service description statement is machine learning program code. A method for generating the machine learning program code is described in detail below with reference to FIG. 4.

Figure 4:
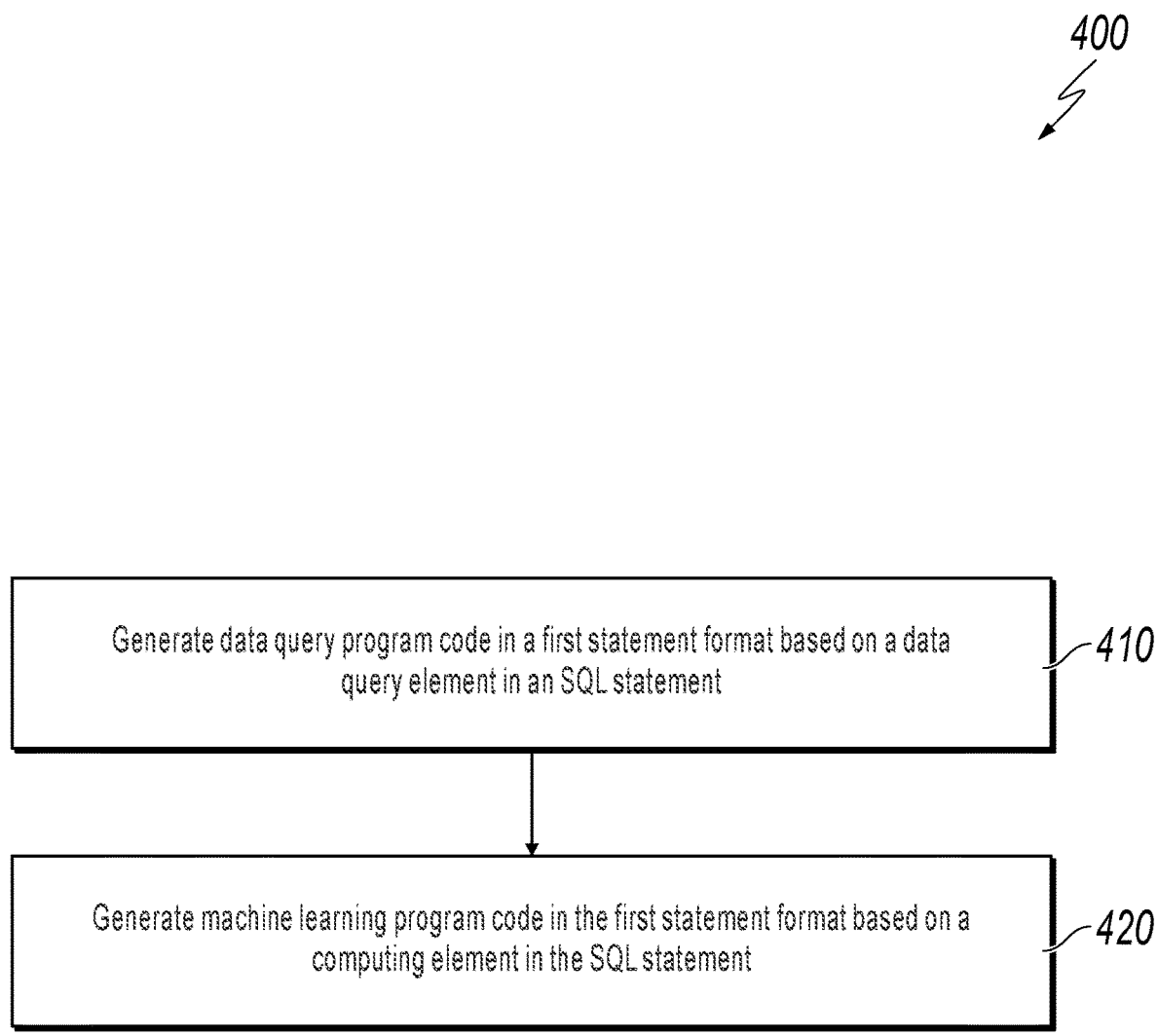
FIG. 4 is a flowchart illustrating a process of generating a computing service description statement based on a structured query language statement, according to an implementation of the present disclosure.

FIG. 4 is a flowchart illustrating an example process of generating a computing service description statement based on an SQL statement, according to an implementation of the present disclosure. The present example is for a machine learning task.

As shown in FIG. 4, first, in block 410, data query program code in a first statement format is generated based on a data query element in an SQL statement. For example, when a target computing service is machine learning model training, like the SQL statement shown in in FIG. 3B, the data query program code in the first statement format that can be identified by a target computing framework can be generated based on "Select * From iris.iris" in FIG. 3B. The data query program code can be executed by the target computing framework to obtain data for the machine learning model training from an SQL database 400. When the target computing service is another type of machine learning task, data query program code in a corresponding format can be generated.

Then, in block 420, machine learning program code in the first statement format is generated based on a computing service element in the SQL statement.

Specifically, for the machine learning task, the computing element can include a machine learning model name, a machine learning model parameter, a machine learning model feature, a machine learning model label, and a machine learning computation result storage address.

Correspondingly, that machine learning program code in the first statement format is generated based on a computing service element in the SQL statement can include the following: A machine learning program code template corresponding to the machine learning model name is invoked, and the machine learning model parameter, the machine learning model feature, and the machine learning model label are provided for the machine learning program code template, to generate the machine learning program code in the first statement format. When the machine learning task is the machine learning model training, the computing element explicitly includes the previously described information. When the machine learning task is machine learning prediction, the computing element is recorded in information at a used model storage address.

Returning back to FIG. 2, after the computing service description statement is generated, the SQL statement processing apparatus 200 submits the generated computing service description statement to the target computing framework 300 in block S209.

After receiving the computing service description statement, the target computing framework 300 invokes data queried by the SQL statement to perform target computation in block S210. For example, when the extended syntax identifier indicates "machine learning model training", the target computing framework 300 obtains data for the machine learning model training from the SQL database 400 by using data query code, and then performs the machine learning model training based on the machine learning program code by using the obtained data.

Then, in block S211, after the target computing framework 300 completes the target computation, the target computing framework 300 stores a target computation result at a machine learning computation result storage address in the SQL database for users queries, thereby implementing a computing service according to an implementation of the present disclosure.

The method for implementing a computing service based on an SQL statement according to an implementation of the present disclosure is described above with reference to FIG. 1 to FIG. 4. It is worthwhile to note here that the illustration shown in FIG. 2 is merely an implementation of the method for implementing a computing service based on an SQL statement according to an implementation of the present disclosure. In another implementation of the present disclosure, the method for implementing a computing service based on an SQL statement shown in FIG. 2 can be further modified.

For example, in another implementation of the present disclosure, the operation of block S201 in FIG. 2 may not be included. In this case, the SQL statement can be obtained in advance and stored in the SQL statement processing apparatus 200.

In addition, in another implementation of the present disclosure, the operation of block S205 in FIG. 2 may not be included. In this case, for an extended SQL statement, it can be considered that there is no semantic problem in the extended SQL statement, so that semantic verification is not required.

In the present disclosure, an existing SQL syntax is extended, so that an extended SQL statement includes information about a computing element needed by a computing service. After an extended SQL statement is received, the extended SQL statement is parsed and a computing service description statement that can be recognized by a target computing framework is generated based on computing element information. As such, a computing service is performed in the target computing framework based on the generated computing service description statement, so that a user's ability to write programs needed for target computing framework is not required.

In the present disclosure, syntax parsing is performed on an SQL statement to determine whether the SQL statement is an extended SQL statement. When the SQL statement is the extended SQL statement, a corresponding computation operation is performed. When the SQL statement is not the extended SQL statement, a conventional SQL query operation is performed, so that users with different needs can perform operations on a same user interface.

In addition, in the present disclosure, before a computing service description statement is generated based on an SQL statement, a semantic query is performed on the received SQL statement, so that a semantic error of the extended SQL statement can be discovered as early as possible, thereby preventing submission of useless machine learning tasks to a machine learning code generation component and saving system resources.

The method for implementing a computing service based on an SQL statement according to an implementation of the present disclosure is described above with reference to FIG. 1 to FIG. 4. The following describes an apparatus for implementing a computing service based on an SQL statement according to an implementation of the present disclosure with reference to FIG. 5 and FIG. 6.

Figure 5:
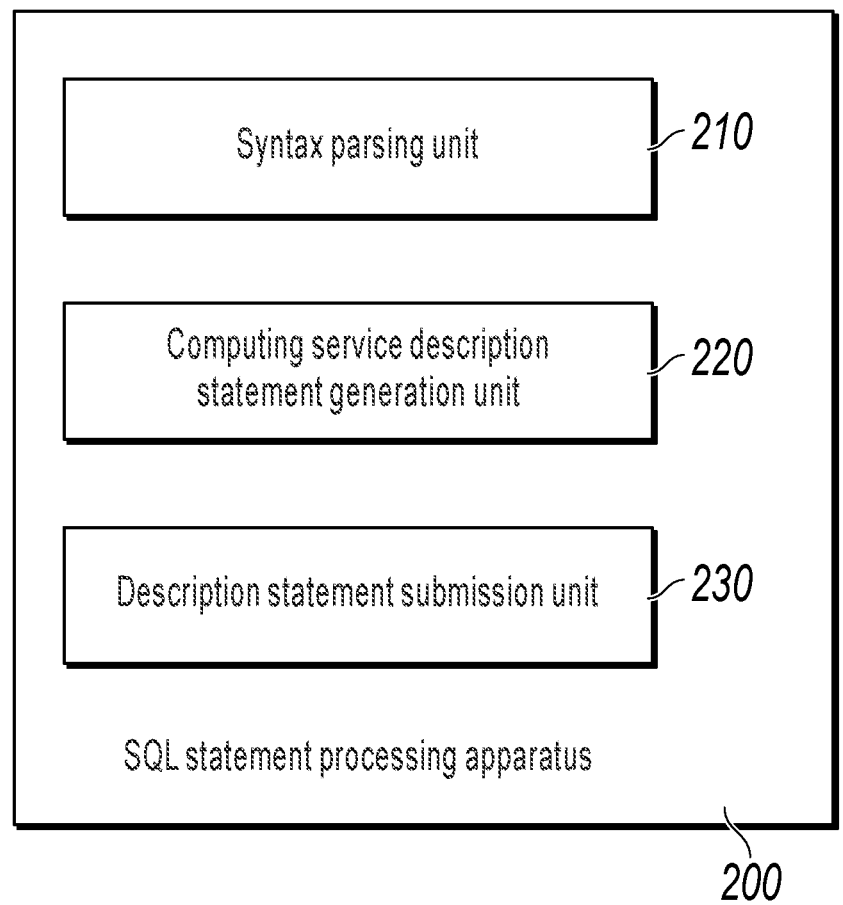
FIG. 5 is a block diagram illustrating an apparatus for implementing a computing service based on a structured query language statement, according to an implementation of the present disclosure.

FIG. 5 is a block diagram illustrating an apparatus 200 for implementing a computing service based on an SQL statement (referred to as an SQL statement processing apparatus below), according to an implementation of the present disclosure. As shown in FIG. 5, the SQL statement processing apparatus 200 includes a syntax parsing unit 210, a computing service description statement generation unit 220, and a description statement submission unit 230.

The syntax parsing unit 210 is configured to perform syntax parsing on an SQL statement to determine whether an extended syntax identifier exists in the SQL statement. The extended syntax identifier indicates a target computing service for the SQL statement. When the extended syntax identifier exists in the structured query language statement, the structured query language statement includes a computing element needed by the target computing service. For an operation of the syntax parsing unit 210, reference can be made to the operation of block S202 described above with reference to FIG. 2.

The computing service description statement generation unit 220 is configured to generate a computing service description statement in a first statement format based on the SQL statement when the extended syntax identifier exists in the SQL statement, where the first statement format is a statement format that can be recognized by a target computing framework. For an operation of the computing service description statement generation unit 220, reference can be made to the operation of block S208 described above with reference to FIG. 2.

Figure 6:
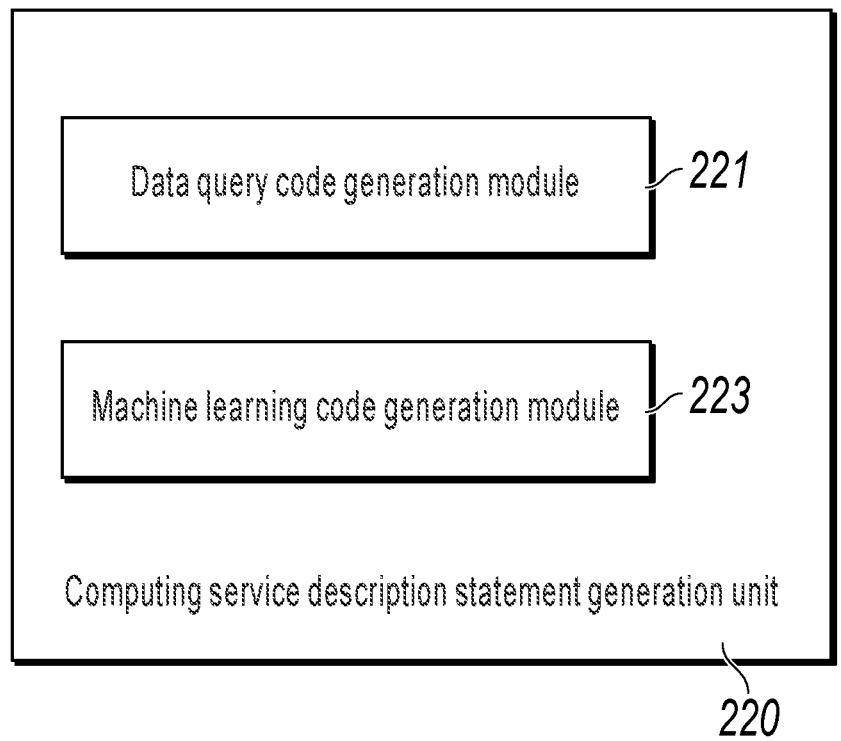
FIG. 6 is a block diagram illustrating an implementation example of a computing service description statement generation unit, according to an implementation of the present disclosure.

FIG. 6 is a block diagram illustrating an implementation example of a computing service description statement generation unit 220, according to an implementation of the present disclosure. The example shown in FIG. 6 is an example of a machine learning computing service. As shown in FIG. 6, the computing service description statement generation unit 220 includes a data query code generation module 221 and a machine learning code generation module 223.

The data query code generation module 221 is configured to generate data query program code in the first statement format based on a data query element in the SQL statement. For an operation of the data query code generation module 221, reference can be made to the operation of block 410 described above with reference to FIG. 4.

The machine learning code generation module 223 is configured to generate machine learning program code in the first statement format based on a computing service element in the SQL statement. Specifically, when the target computing service includes the machine learning computing service, the computing element includes a machine learning model name, a machine learning model parameter, a machine learning model feature, a machine learning model label, and a machine learning computation result storage address. Correspondingly, the machine learning code generation module is configured to invoke a machine learning program code template corresponding to the machine learning model name, and provide the machine learning model parameter, the machine learning model feature, and the machine learning model label to the machine learning program code template, to generate the machine learning program code in the first statement format. For an operation of the machine learning code generation module 223, reference can be made to the operation of block 420 described above with reference to FIG. 4.

Returning back to FIG. 5, the description statement submission unit 230 is configured to submit the generated computing service description statement to the target computing framework 300, to invoke, in the target computing framework 300 based on the computing service description statement, data queried by the SQL statement to perform target computation.

In addition, in another example of the present disclosure, the SQL statement processing apparatus 200 can further include a semantic verification unit (not shown). The semantic verification unit is configured to perform semantic verification on the SQL statement before the computing service description statement in the first statement format is generated based on the SQL statement. In addition, after the SQL statement semantic verification succeeds, the computing service description statement generation unit 220 performs an operation.

In addition, in another example of the present disclosure, the SQL statement processing apparatus 200 can further include a statement acquisition unit (not shown). The statement acquisition unit is configured to obtain the structured query language statement from a client input.

Implementations of the method and apparatus for implementing a computing service based on an SQL statement according to an implementation of the present disclosure are described above with reference to FIG. 1 to FIG. 6. The SQL statement processing apparatus can be implemented by using hardware, or can be implemented by using software or a combination of hardware and software.

Figure 7:
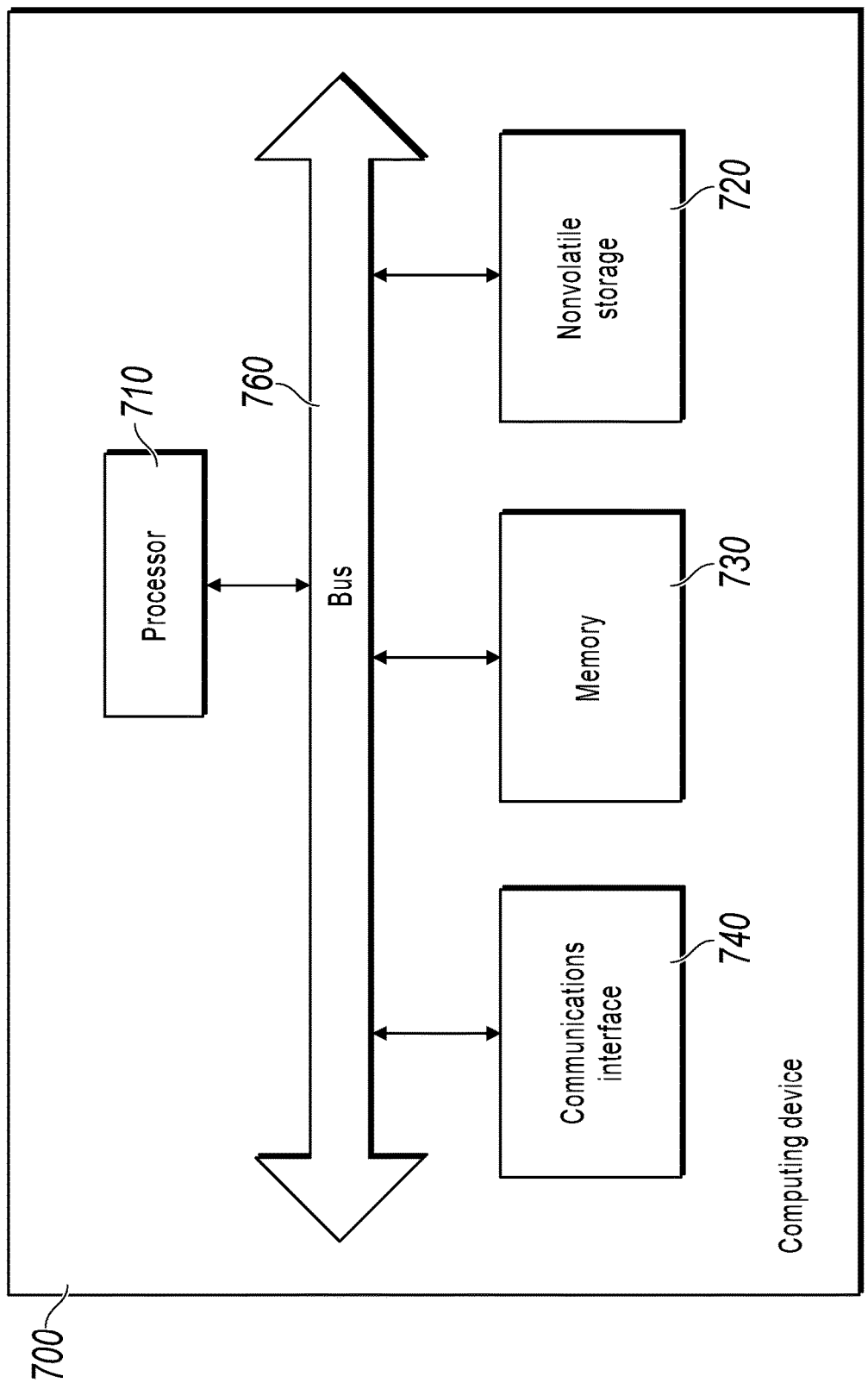
FIG. 7 is a block diagram illustrating a computing device for implementing a computing service based on a structured query language statement, according to an implementation of the present disclosure.

FIG. 7 is a block diagram illustrating a computing device 700 for implementing a computing service based on an SQL statement, according to an implementation of the present disclosure. As shown in FIG. 7, the computing device 700 can include at least one processor 710, a storage device 720, a memory 730, and a communications interface 740, and the at least one processor 710, the storage device 720, the memory 730, and the communications interface 740 are connected together by using a bus 760. The at least one processor 710 executes at least one computer readable instruction (i.e., the previously described element implemented in a software form) stored or encoded in the storage device.

In an implementation, a computer executable instruction is stored in the storage device, and when the computer executable instruction is executed, the at least one processor 710 is enabled to: perform syntax parsing on an SQL statement to determine whether an extended syntax identifier exists in the SQL statement, where the extended syntax identifier indicates a target computing service for the SQL statement; generate a computing service description statement in a first statement format based on the SQL statement when the extended syntax identifier exists in the SQL statement, where the first statement format is a statement format that can be recognized by a target computing framework; and submit the generated computing service description statement to the target computing framework, to invoke, in the target computing framework based on the computing service description statement, data queried by the SQL statement to perform target computation, where the SQL statement includes a computing element needed by the target computing service, when the extended syntax identifier exists in the SQL statement.

It should be understood that, when the computer executable instruction stored in the storage device is executed, the at least one processor 710 is enabled to perform the operations and functions described with reference to FIG. 1 to FIG. 6 in the implementations of the present disclosure.

In the present disclosure, the computing device 700 can include but is not limited to a personal computer, a server computer, a workstation, a desktop computer, a laptop computer, a notebook computer, a mobile computing device, a smartphone, a tablet computer, a cellular phone, a personal digital assistant (PDA), a handheld apparatus, a message sending and receiving device, a wearable computing device, a consumer electronics, etc.

According to an implementation, a program product such as a non-transitory machine-readable medium is provided. The non-transitory machine-readable medium can have an instruction (i.e., the previously described element implemented in a software form). When the instruction is executed by a machine, the machine performs the operations and functions described with reference to FIG. 1 to FIG. 6 in the implementations of the present disclosure. Specifically, a system or apparatus equipped with a readable storage medium can be provided, and software program code for implementing a function of any one of the previous implementations is stored in the readable storage medium, so that a computer or a processor of the system or the apparatus reads out and executes an instruction stored in the readable storage medium.

In this case, program code read from the readable medium can implement a function of any one of the previous implementations. Therefore, machine-readable code and a readable storage medium that stores the machine-readable code constitute a part of the present invention.

An implementation of the readable storage medium include a floppy disk, a hard disk, a magneto-optical disk, an optical disc (such as a CD-ROM, a CD-R, a CD-RW, a DVD-ROM, a DVD-RAM, a DVD-RW, and a DVD-RW), a magnetic tape, a non-volatile memory card, and a ROM. Optionally, program code can be downloaded from a server computer or a cloud through a communications network.

A person skilled in the art should understand that various variations and modifications can be made to the implementations disclosed above without departing from the essence of the present invention. Therefore, the protection scope of the present invention shall be limited by the appended claims.

It is worthwhile to note that not all steps and units in the previous processes and system structural diagrams are necessary, and some steps or units can be ignored based on an actual demand. An execution sequence of the steps is not fixed, and can be determined based on a demand. The apparatus structure described in the previous implementations can be a physical structure, or can be a logical structure, to be specific, some units may be implemented by a same physical entity, or some units may be implemented by a plurality of physical entities, or can be implemented jointly by some components in a plurality of independent devices.

In the previous implementations, the hardware unit or module can be implemented in a mechanical or electrical method. For example, a hardware unit or module or a processor can include a permanent dedicated circuits or logic (e.g., a dedicated processor, an FPGA, or an ASIC) to complete a corresponding operation. The hardware unit or the processor can further include a programmable logic or circuit (e.g. a general purpose processor or another programmable processor), and can be temporarily set by software to complete a corresponding operation. A specific implementation method (a mechanical manner, a dedicated permanent circuit, or a temporarily set circuit) can be determined based on costs and time.

Exemplary implementations are described in specific implementations that are illustrated above with reference to the accompanying drawings. However, the implementations do not represent all implementations that can be implemented or fall within the protection scope of the claims. The term "example" used throughout the present specification means "used as an example, instance, or illustration" and does not mean "preferred" or "advantageous" over other implementations. For the purpose of providing an understanding for the described technologies, a specific implementation includes specific details. However, these technologies can be implemented without these specific details. In some instances, well-known structures and apparatuses are shown in block diagrams to avoid making it difficult to understand the concepts of the described implementations.

The previous descriptions of the present disclosure are provided to enable a person of ordinary skill in the art to implement or use the present disclosure. Various modifications made to the present disclosure are obvious to a person of ordinary skill in the art. In addition, the general principle described in the present specification can be applied to another variant without departing from the protection scope of the present disclosure. Therefore, the present disclosure is not limited to the examples and designs described in the present specification, but is consistent with the widest range that conform to principles and novelty features disclosed in the present specification.

Techniques described herein produce one or more technical effects. For example, development efficiency for a computing service, such as training a machine learning model, performed in a target computing framework, is improved. The SQL statement processing apparatus can generate a computing service description statement, such as machine learning program code, that can be recognized by, and performed in, the target computing framework based on the computing service description statement.

The described techniques can also save computer processing cycles, computer memory/storage usage, and network bandwidth when compared to generating computing services using traditional development methods. For example, traditional development methods require a developer to write and debug programs to develop the computing service, which can be prone to errors and may involve a large amount of data processing and data transfers to repeatedly test the programs in order to develop a computing service that can be eventually executed by the target computing service framework. With the described techniques, a SQL statement processing apparatus can generate the computing service description statement in a first statement format, such as generating data query program code or machine learning program code in the first statement format, that can be recognized by the target computing framework. The described techniques can prevent unnecessary data processing by the developer, which increases computer processing cycles and computer memory usage, or unnecessary network data transfers between computing devices and computer data stores for the testing of the program written by the developer.

What is claimed is:

1. A method for implementing a computing service based on a structured query language (SQL) statement, comprising:

performing syntax parsing on a SQL statement to determine whether an extended syntax identifier exists in the SQL statement, wherein the extended syntax identifier indicates a target computing service for the SQL statement, wherein the target computing service comprises a training service or a prediction service based on a machine learning model, wherein the SQL statement comprises a data query element for obtaining a training dataset to be used in the machine learning model;

determining that the extended syntax identifier exists in the SQL statement and that the SQL statement is an extended SQL statement;

determining that the extended SQL statement includes a computing element for configuring the machine learning model when executing the machine learning model based on the training dataset obtained, wherein the computing element comprises configuration parameters including a machine learning model name, a machine learning model parameter, a machine learning model feature, a machine learning model label, and a machine learning computation result storage address of the machine learning model;

generating a computing service description statement in a first statement format based on the extended SQL statement comprising:

generating data query program code in a first statement format based on the data query element in the extended SQL statement; and generating machine learning program code in the first statement format based on the computing element in the extended SQL statement, wherein the first statement format is a statement format that can be recognized by a target computing framework; and submitting the computing service description statement to the target computing framework, which i) executes the data query program code to obtain the training dataset queried by the data query element in the extended SQL statement for the machine learning model and ii) executes the machine learning program code with the training dataset obtained, using the configuration parameters included in the computing element in the extended SQL statement to perform the target computing service.

2. The method according to claim 1, wherein the target computing service comprises a machine learning computing service or a cluster computing service.

3. The method according to claim 2, wherein the machine learning computing service comprises machine learning model training or machine learning model prediction.

4. The method according to claim 1, wherein generating the machine learning program code in the first statement format based on the computing element in the extended SQL statement comprises:
  invoking a machine learning program code template corresponding to the machine learning model name; and
  providing the machine learning model parameter, the machine learning model feature, and the machine learning model label to the machine learning program code template, to generate the machine learning program code in the first statement format.

5. The method according to claim 4, wherein after the target computing framework invokes the training dataset queried by the extended SQL statement to perform the target computing service based on the machine learning program code, the target computing framework stores a target computation result in the machine learning computation result storage address in a SQL database.

6. The method according to claim 1, wherein before generating the computing service description statement in the first statement format based on the extended SQL statement, the method further comprises:
  performing semantic verification on the extended SQL statement.

7. A non-transitory, computer-readable medium storing one or more instructions executable by a computer system to perform operations comprising:
  performing syntax parsing on a SQL statement to determine whether an extended syntax identifier exists in the SQL statement, wherein the extended syntax identifier indicates a target computing service for the SQL statement, wherein the target computing service comprises a training service or a prediction service based on a machine learning model, wherein the SQL statement comprises a data query element for obtaining a training dataset to be used in the machine learning model;
  determining that the extended syntax identifier exists in the SQL statement and that the SQL statement is an extended SQL statement;
  determining that the extended SQL statement includes a computing element for configuring the machine learning model when executing the machine learning model based on the training dataset obtained, wherein the computing element comprises configuration parameters including a machine learning model name, a machine learning model parameter, a machine learning model feature, a machine learning model label, and a machine learning computation result storage address of the machine learning model;
  generating a computing service description statement in a first statement format based on the extended SQL statement comprising:
    generating data query program code in a first statement format based on the data query element in the extended SQL statement; and
    generating machine learning program code in the first statement format based on the computing element in the extended SQL statement, wherein the first statement format is a statement format that can be recognized by a target computing framework; and
  submitting the computing service description statement to the target computing framework, which i) executes the data query program code to obtain the training dataset queried by the data query element in the extended SQL statement for the machine learning model and ii) executes the machine learning program code with the training dataset obtained, using the configuration parameters included in the computing element in the extended SQL statement to perform the target computing service.

8. The non-transitory, computer-readable medium according to claim 7, wherein the target computing service comprises a machine learning computing service or a cluster computing service.

9. The non-transitory, computer-readable medium according to claim 8, wherein the machine learning computing service comprises machine learning model training or machine learning model prediction.

10. The non-transitory, computer-readable medium according to claim 7, wherein generating the machine learning program code in the first statement format based on the computing element in the extended SQL statement comprises:
  invoking a machine learning program code template corresponding to the machine learning model name; and
  providing the machine learning model parameter, the machine learning model feature, and the machine learning model label to the machine learning program code template, to generate the machine learning program code in the first statement format.

11. The non-transitory, computer-readable medium according to claim 10, wherein after the target computing framework invokes the training dataset queried by the extended SQL statement to perform the target computing service based on the machine learning program code, the target computing framework stores a target computation result in the machine learning computation result storage address in a SQL database.

12. The non-transitory, computer-readable medium according to claim 7, wherein before generating the computing service description statement in the first statement format based on the SQL statement, the operations further comprise:
  performing semantic verification on the extended SQL statement.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    performing syntax parsing on a SQL statement to determine whether an extended syntax identifier exists in the SQL statement, wherein the extended syntax identifier indicates a target computing service for the SQL statement, wherein the target computing service comprises a training service or a prediction service based on a machine learning model, wherein the SQL statement comprises a data query element for obtaining a training dataset to be used in the machine learning model;
    determining that the extended syntax identifier exists in the SQL statement and that the SQL statement is an extended SQL statement;

determining that the extended SQL statement includes a computing element for configuring the machine learning model when executing the machine learning model based on the training dataset obtained, wherein the computing element comprises configuration parameters including a machine learning model name, a machine learning model parameter, a machine learning model feature, a machine learning model label, and a machine learning computation result storage address of the machine learning model;

generating a computing service description statement in a first statement format based on the extended SQL statement comprising:
- generating data query program code in a first statement format based on the data query element in the extended SQL statement; and
- generating machine learning program code in the first statement format based on the computing element in the extended SQL statement, wherein the first statement format is a statement format that can be recognized by a target computing framework; and submitting the computing service description statement to the target computing framework, which i) executes the data query program code to obtain the training dataset queried by the data query element in the extended SQL statement for the machine learning model and ii) executes the machine learning program code with the training dataset obtained, using the configuration parameters included in the computing element in the extended SQL statement to perform the target computing service.

14. The computer-implemented system according to claim 13, wherein the target computing service comprises a machine learning computing service or a cluster computing service.

15. The computer-implemented system according to claim 14, wherein the machine learning computing service comprises machine learning model training or machine learning model prediction.

16. The computer-implemented system according to claim 13, wherein generating the machine learning program code in the first statement format based on the computing element in the extended SQL statement comprises:
- invoking a machine learning program code template corresponding to the machine learning model name; and
- providing the machine learning model parameter, the machine learning model feature, and the machine learning model label to the machine learning program code template, to generate the machine learning program code in the first statement format.

17. The computer-implemented system according to claim 16, wherein after the target computing framework invokes the training dataset queried by the extended SQL statement to perform the target computing service based on the machine learning program code, the target computing framework stores a target computation result in the machine learning computation result storage address in a SQL database.

* * * * *